(12) United States Patent
Abato, Jr.

(10) Patent No.: US 7,476,070 B1
(45) Date of Patent: Jan. 13, 2009

(54) CHAIN TIEDOWN FOR TRANSPORTATION VEHICLE

(75) Inventor: Ralph L. Abato, Jr., New Britain, CT (US)

(73) Assignee: Ancra International, LLC, Erlanger, KY (US)

( * ) Notice: Subject to any disclaimer, the term of this patent is extended or adjusted under 35 U.S.C. 154(b) by 0 days.

(21) Appl. No.: 11/897,037

(22) Filed: Aug. 28, 2007

(51) Int. Cl.
*B60P 7/08* (2006.01)

(52) U.S. Cl. .................. 410/107; 410/106; 410/111; 410/112; 410/116

(58) Field of Classification Search .............. 410/101, 410/102, 106, 97, 107, 109, 110, 111, 112, 410/116; 24/299, 116 R, 265 CD; 248/499
See application file for complete search history.

(56) References Cited

U.S. PATENT DOCUMENTS

| | | | |
|---|---|---|---|
| 3,018,079 A | 1/1962 | Stough | |
| 3,865,048 A * | 2/1975 | Wallace | 410/111 |
| 4,242,965 A | 1/1981 | Granet | |
| 5,674,033 A | 10/1997 | Ruegg | |
| 5,676,060 A | 10/1997 | Van Lierde | |
| 5,853,164 A | 12/1998 | Hunt | |
| 6,250,861 B1 | 6/2001 | Whitehead | |
| 6,315,509 B1 * | 11/2001 | Nadherny et al. | 410/116 |
| 6,527,487 B2 | 3/2003 | Adams | |

* cited by examiner

*Primary Examiner*—Stephen Gordon
(74) *Attorney, Agent, or Firm*—Law Office of Robert E. Kasody, P.C.

(57) ABSTRACT

A device consisting of a short chain fitting is linked to the floor of a transportation vehicle, such as a flatbed trailer. The chain fitting has a cap on one end thereof, which is installed in a mating aperture formed in the vehicle floor. The cap is installed on the top side of the floor with a short chain piece attached thereto running through the aperture with a second cap at the lower end which is secured to the lower end of the chain. A length of securing chain is attached to the chain fitting, this length of chain running substantially vertical to the floor and attached to cargo to be restrained. The cap is partially beveled along its contact surface with the floor and engages the sides of the aperture on the top part of the floor. The cap itself and the beveled surface thereon facilitate detachment of the chain fitting when so required.

6 Claims, 2 Drawing Sheets

CHAIN TIEDOWN FOR TRANSPORTATION VEHICLE

FIELD OF THE INVENTION

This invention relates to chain tie downs for use in restraining or positioning cargo in a transportation vehicle such as a flatbed trailer and more particularly to such a device, which has an end piece which is mounted in a mating aperture on the floor of the vehicle.

BACKGROUND OF THE INVENTION

Chains tied to the floor of a vehicle for use in driving conveyer belts or for retaining cargo in place are used extensively in the prior art. Such a system, which drives conveyor belts, is described in Pat. No. 5,676,060 issued on Oct. 14, 1997 to Van Lierde. The prior art tie downs for securing chains to the floor of a vehicle are often difficult to remove particularly when they become corroded when there are adverse environmental conditions. This is obviously highly undesirable. The device of the present invention overcomes these shortcomings by providing a tie down which is not secured to the floor but rather mounted thereon so that when there is tension on a chain attached thereto, the attachment is firm and secure, yet such tie down can readily be released, even when corroded.

SUMMARY OF THE INVENTION

The device of the present invention includes a cap portion, which is fitted into a mating aperture in the floor of the vehicle. The cap is installed in the top deck of the trailer floor with the chain attached thereto being positioned and hanging below the upper surface of the floor. The cap is partially beveled along its contact surface with the floor aperture and this beveled portion abuts against the edge of the aperture in the top side of the floor. The provision of the pivotally beveled surface on the cap which abuts against the edge of the floor aperture facilitates removal of the cap. When pressure is placed on the top edge of the cap above the beveled area, the cap can be tipped up to allow the opposite edge to be accessed for gripping the cap and pulling the chain up above the floor. When the chain is its installed position, it is available for attaching the hook end of a securing chain for use in cargo restraint.

DETAILED DESCRIPTION OF THE INVENTION

Figure 1:
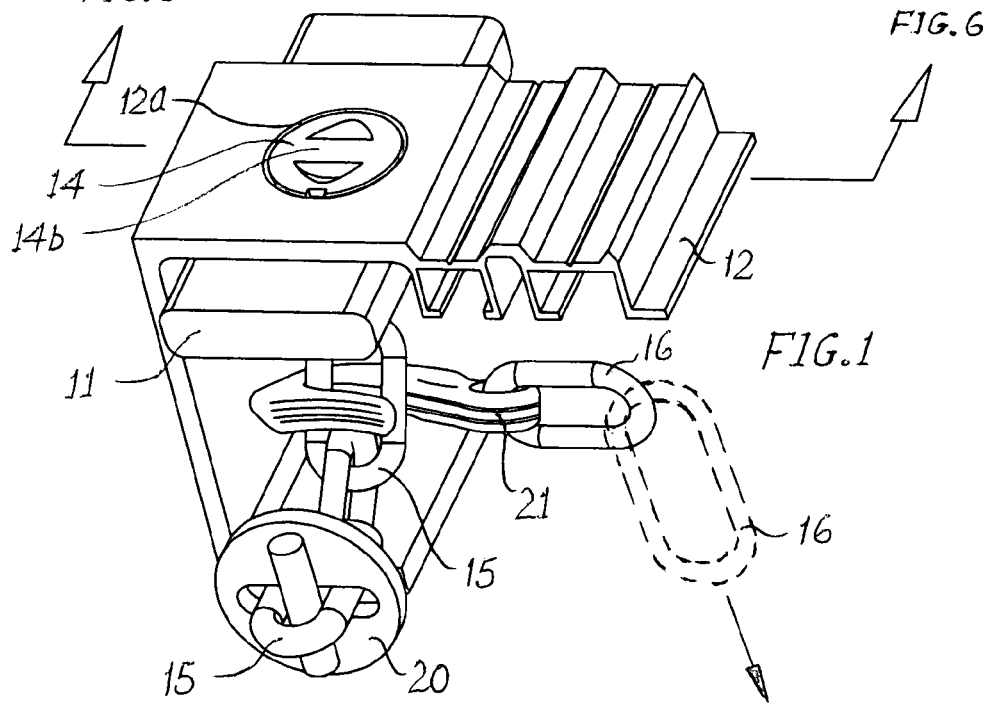
FIG. 1 is a top perspective view showing a preferred embodiment of the invention attached to the floor of a vehicle.
Figure 2:
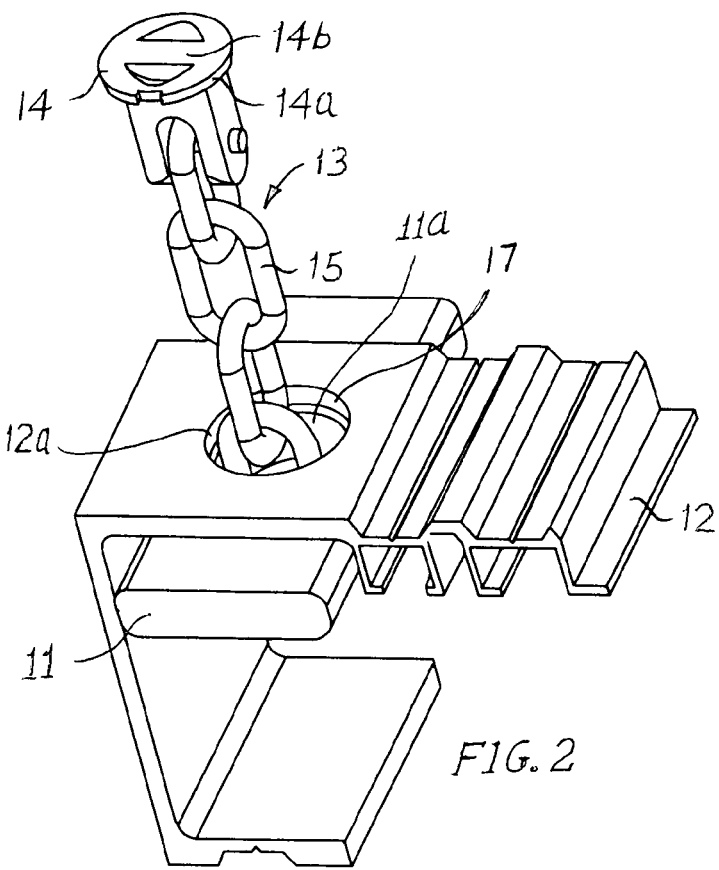
FIG. 2 is a top perspective view of the preferred embodiment of the connector cap and the chain connected thereto drawn away from the vehicle floor.
Figure 6:
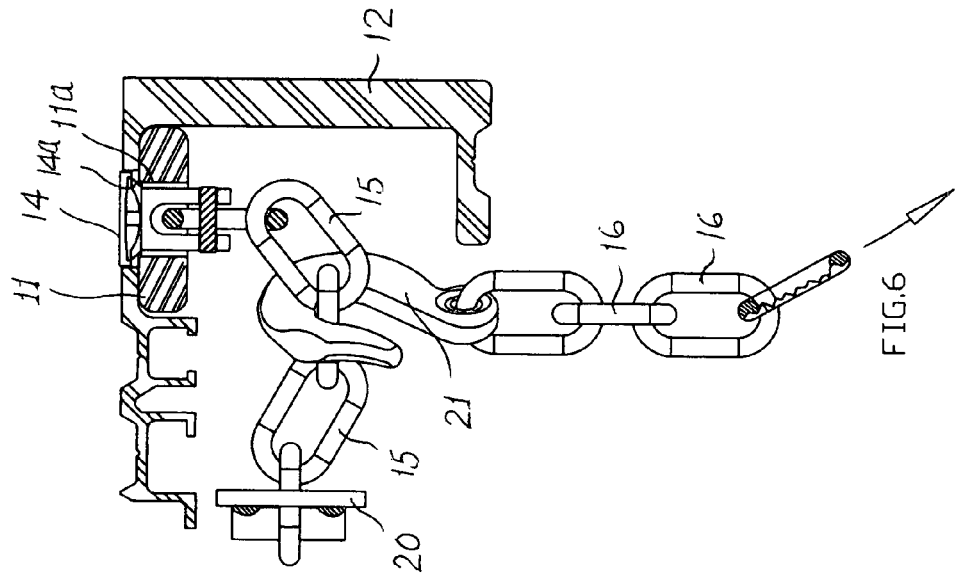
FIG. 6 is a side elevational view partly in cross section illustrating the connection of the cap to the securing chain for use in securing cargo.

Referring now to the Figs, a preferred embodiment of the invention is illustrated. Vehicle floor 11 has a substantially round aperture 11a formed there through. Chain fitting 13 has a cap 14 on the upper end thereof and a short support chain piece 15 running from cap 14 to lower cap 20 on the opposite side thereof. Cap 14 is installed on the upper side of the floor and fitted in aperture 11a formed in floor structure 11 which is secured through the round aperture 12a of the support bracket 12. The part of the cap which fits into aperture 11a is shaped so that the lower end portion of the cap readily fits into aperture 11a formed in floor structure 11. The diameter of aperture 12a is greater than that of aperture 11a so that a rim 17 is formed between the two apertures against which the edge portion 14a of cap 14 abuts.

Figure 5:
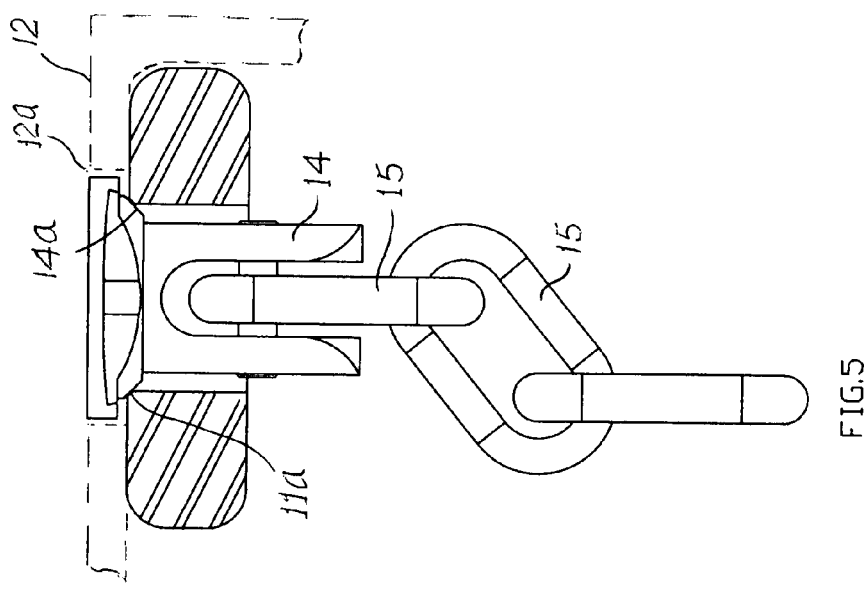
FIG. 5 is a cross sectional taken along the plane indicated by 5-5 in FIG. 4 showing the cap and chain attached thereto of the preferred embodiment.
Figures 3, 4:
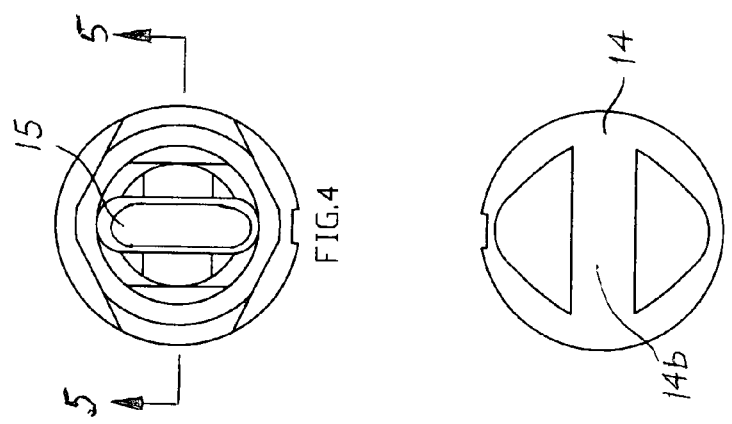
FIG. 3 is a top plan view of the cap of the preferred embodiment.
FIG. 4 is a bottom plan view of the cap of the preferred embodiment.

As can best be seen in FIG. 5, the part of the cap that fits into aperture 11a is beveled, the beveled portions 14a of the cap and the aperture sides fitting together in mating apparatus.

As shown in FIG. 5, a securing chain 16 for use in either retaining or positioning cargo is firmly attached to chain piece 15 by grab hook 21. Chain 16 generally runs substantially vertical to the floor so that when it is placed under tension it will draw the lower cap 20 tightly into the aperture in the floor and will not act to draw the cap out of the aperture.

While the cap 14 is held in the floor, when the chain fitting is not is used, the beveled portion 14a permits ready release of the cap from the aperture in the floor so that the chain fitting can be pulled up into position for use in securing cargo. The cap can readily be released by pushing down on it from the top of the vehicle floor. A handle 14b is also installed on the cap, as another option to facilitate its release manually.

While the invention has been described and illustrated in detail it is to be understood that this is intended by way of illustration and example only and not by way of limitation, the spirit and scope of the invention being limited by the terms of the following claims.

I claim:

1. A device in form of a chain fitting for firmly holding a support chain to a floor of a vehicle, said floor having a floor aperture formed therein, a bracket attached to the floor, said bracket having a bracket aperture formed therein directly opposite the floor aperture, a support chain being attached at a first end thereof to cargo being restrained in said vehicle, said device comprising:

an upper cap attached to a first end of said chain fitting;

said upper cap being installed on a top side of the floor with the second end of said chain fitting running through said floor aperture and bracket aperture and through a top side of the bracket;

a lower cap; said lower cap being attached to a second end of said chain fitting opposite to said first end thereof;

said bracket aperture having a greater diameter a diameter of the floor aperture to form a rim between said bracket aperture and said floor aperture a mating surface of said upper cap comprising a beveled edge portion that is removably attachable to the floor aperture and abutting against said rim;

means for removably attaching said support chain to the second end of said chain fitting;

wherein the chain fitting and the support chain are firmly retained to the vehicle floor to prevent removal of the chain fitting from the floor of the vehicle when the chain fitting and the support chain are placed under tension; and wherein at least one portion of the chain fitting is accessible for connecting with the support chain while the at least one portion of the chain fitting is enclosed within an inner area substantially bounded by the bracket.

2. The device of claim 1 further comprising a chain piece along a section of the chain fitting to provide at least one location to secure the cargo to the chain fitting using a grab hook.

3. The device of claim 2 wherein said upper cap detachably connects with the floor of the vehicle utilizing a handle built in the upper cap; and wherein the beveled edge portion contacts a top side of the floor aperture to provide detachability of the upper cap from the floor aperture to allow repositioning or retaining of the chain fitting to secure the cargo.

4. The device of claim 1 wherein said means for removably attaching said support chain to the second end of the chain fitting comprises a clamping hook which fits over the support chain and the chain fitting.

5. The device of claim 1 wherein said upper cap has a handle formed thereon for use in installing and removing the upper cap from the bracket aperture and the floor aperture.

6. The device of claim 1 and wherein the upper cap attached to the first end of said chain fitting receives tension from said chain fitting; and wherein the lower cap tightly fits into the floor aperture to prevent the lower cap being released from the floor aperture when the chain fitting occupies a substantially vertical position.

* * * * *